United States Patent Office 3,400,141
Patented Sept. 3, 1968

3,400,141
METHOD OF PREPARING ALIPHATIC
TIN HALIDES
Peter Albert Theodore Hoye, Kinver, Stourbridge, and Philip Sunderland, Wollescote, Stourbridge, England, assignors to Albright & Wilson (Mfg.) Limited, Oldbury, near Birmingham, Warwickshire, England, a British company
No Drawing. Filed Mar. 23, 1965, Ser. No. 442,204
17 Claims. (Cl. 260—429.7)

This invention relates to a method for preparing organotin compounds.

Difficulties have hitherto been encountered in preparing organotin halides such as the alkyltin chlorides. In particular the preparation of mono-organotin trihalides has proved difficult and expensive.

We have now discovered that when a compound containing divalent sulphur and/or divalent selenium is present as a catalyst, stannous halides will react readily with aliphatic organic halides (including relatively inactive halides such as alkyl chlorides) to form organotin halides, with the mono-organotin trihalide predominating. This latter compound is formed by the reaction $$SnX_2 + RX \xrightarrow{catalyst} RSnX_3$$

and we have found that it is formed substantially uncontaminated with other organotin halides when an alkyl chloride is used as reactant.

The present invention thus provides a method of preparing organotin halides which comprises reacting a stannous halide with an organic halide containing at least one atom of chlorine bromine or iodine directly linked to an aliphatic carbon atom in the presence of a catalyst containing one or more divalent sulphur atoms and/or divalent selenium atoms, i.e. containing at least one chalcogen atom having an atomic number of from 16 to 34.

The stannous halides preferred for use in the invention are stannous chloride, stannous bromide and stannous iodide i.e. those in which the halogen has an atomic number of at least 17. For economic reasons stannous chloride is the most preferred of these.

The organic halides used in the present invention are those organic chlorides, bromides and iodides wherein a halogen atom having an atomic number of at least 17 is attached directly to an aliphatic carbon atom, and include organic polyhalides wherein one or more of the aforementioned halogen atoms is attached directly to an aliphatic carbon atom. The aliphatic carbon atom may be part of an alkyl, aralkyl or alkenyl group, and may be an allylic carbon atom. Examples include methyl iodide, ethyl bromide, n-butyl bromide, n-hexyl chloride, n-octyl chloride, lauryl bromide, cetyl chloride. Aliphatic halides preferred for present use include aliphatic chlorides, bromides and iodides having from one to eight carbon atoms, allyl chloride, methallyl chloride and benzyl and substituted benzyl chlorides, bromides and iodides. Although the reactivities of the bromides and iodides are greater, the use of the chlorides is preferred on account of their lower cost. It is a feature of the present invention that relatively inactive organic chlorides, such as the primary alkyl chlorides, may be used to prepare mono-organotin trihalides and that these are obtained substantially free from the corresponding di-organotin dihalides and tri-organotin mono-halides.

The catalyst is characterised solely by the presence of a divalent sulphur or selenium atom. Among the compounds preferred as catalysts are organic compounds containing a mercapto or hydroselenide group or a substituted mercapto or hydroselenide group. For example, there may be employed mercaptans (RSH), hydroselenides (RSeH), metal salts of either of the aforementioned, dimercaptans (HS—R'—SH), dihydroselenides (HSeR'SeH), sulphides (R—S—R"), selenides (R—Se—R"), disulphides (R—S—S—R")

diselenides (R—Se—Se—R"), polysulphides (R—(S)$_x$—R")

wherein R and R" are each hydrocarbon groups, preferably alkyl groups which may be substituted with inert substituents such as dialkylamino, alkoxy, alkylthio, carboxylic acid or esterified carboxylate group, and R' is a divalent hydrocarbon or substituted hydrocarbon group. Especially preferred catalysts for present use are the alkyl mercaptans and dialkyl sulphides. Thiocarboxylic acids and esters thereof have also been found effective. In general, sulphur compounds are more convenient to use than selenium compounds.

As examples of catalysts of the above types may be mentioned the butyl, octyl and dodecyl mercaptans and hydroselenides, bibutyl disulphide, dilauryl disulphide, dicetyl disulphide, ditridecyl diselenide, dilauryl diselenide, dibutylaminoethyl mercaptan, butoxyethyl mercaptan, p-chlorophenyl mercaptan, iso-octyl thioglycollate, dibutyl sulphide and dibutyl selenide.

Other compounds that may be used as catalysts include those in which the divalent sulphur atom form part of an acidic group, for example the salts and esters of thiophosphoric acid and thiophosphorous acid, xanthic acid, dithiocarbamic acid and thiocarboxylic acids (RCOSH)

where R is a hydrocarbon or substituted hydrocarbon group. The two sulphur valencies may be linked to the same atom as, for example, in the thioamides (RCSNH$_2$) (where R is as before) and in carbon disulphide. As examples of these compounds may be mentioned trilauryl trithiophosphite, dibutyl and dioctyl dithiophosphates, zinc and copper diethyldithiocarbamates and organotin mercaptides and selenides. Purely inorganic compounds containing a divalent sulphur or selenium atom have also been found effective for present purposes, for example there may be used phosphorus pentasulphide, sulphur monochloride, selenium monochloride, thiourea, and even elemental sulphur. Mixtures containing any of these catalysts may also be used.

As catalysts there may also be employed compounds which, though not themselves possessing a divalent sulphur or selenium atom, are capable of being reduced or decomposed during the reaction with the formation of such an atom; for instance, dimethyl sulphoxide may be used as catalyst.

The process of the invention is carried out by heating together the stannous halide, organic halide and catalyst at elevated temperatures, for example from 50° C. to 250° C. and preferably from 100° to 200° C. It is often convenient to carry out the reaction in a pressure vessel under autogenous pressure. The aliphatic halide is preferably present in stoichiometric excess and preferably 4 to 5 times the theoretical quantity. Even after heating for 6 to 12 hours the reaction is not generally complete but the unreacted starting materials are readily recovered for re-use. The catalyst may be used in any desired amount, but 0.02 to 0.5 mole per mole of stannous halide appears to be the optimum quantity.

Normally the reactants are heated together with the catalyst using the excess organic halide as reaction medium, but an inert solvent, preferably a solvent containing an oxygen atom, may also be present as diluent if required. Suitable diluents include aliphatic ethers or cyclic ethers such as diethyl ether, dibutyl ether, tetrahydrofuran, dioxan, ethylene glycol dimethyl ether, ethylene glycol diethyl ether or diethylene glycol dimethyl ether, or liquid hydrocarbons such as hexane, iso-octane, benzene, toluene or xylene, or petroleum ether. We have also found that diluents containing hydroxyl groups may be employed, such as, for instance, alcohols, phenols and ether alcohols, though such active solvents should not be used in high concentrations since they tend to form condensation products with the organic halides and the organotin halides. In small amounts, however, such active solvents appear to have a catalytic effect on the process of the invention.

It is preferred that the process of the invention be carried out in the presence of at least one co-catalyst. The co-catalyst may be metallic magnesium, zinc, cadmium, mercury, copper, cobalt, nickel, aluminum, titanium, manganese, iron, calcium, chromium or a compound or alloy of such a metal, especially a salt, alkoxide or mercaptide thereof. Thus the co-catalyst may be present in combination with the sulphur-containing or selenium-containing catalyst, for example as a mercaptide salt or as a thioalkoxy metal halide. Also as co-catalyst there may be present bromine, iodine, an interhalogen compound such as iodine chloride, iodine trichloride or iodine bromide, or a compound which liberates iodine at the reaction temperature employed, or (when not present as reactant) an alkyl iodide; in the last mentioned case the alkyl group is preferably the same as the alkyl group of the halide reactant. The preferred co-catalyst is metallic magnesium. Mixtures of co-catalysts often give advantageous results, for example a mixture of magnesium and iodine. The co-catalysts may be employed in amounts up to 0.1 mole per mole of stannous halide present.

After the reaction has been carried out, the residual stannous halide may be removed by filtration, centrifuging or decantation. Residual aliphatic halides may be removed by distillation, being appreciably less volatile than the organotin halides, though many of the mono-organotin trihalide products may also be distilled without decomposition, particularly under reduced pressure, and they may, therefore, be purified in this way.

The resulting organotin halides are valuable intermediates in the preparation of stannoic acids and polymers thereof, stabilisers for synthetic polymers, and catalysts for the production of foamed polyurethane resins.

The invention is illustrated by the following examples.

Example 1

Anhydrous stannous chloride (100 g.), butyl chloride (450 ml.), dibutyldisulphide (5 g.), iodine (2 g.), and magnesium (0.5 g.) were placed in an autoclave and heated at 175° C. for 12 hours. The reaction product was removed from the autoclave and filtered to remove solids and the solids washed with butyl chloride. The solutions of product and butyl chloride washings were combined and distilled giving a butyl chloride fraction (444 g.) which contained 2.2 g. tin as butyltin trichloride, a fraction containing butyltin trichloride 108.9 g. (Found: Sn 37.9%, Cl 33.0%) and a residue 14.7 g. (Found: S 5.9%, Sn 15.2%). Analysis of the solids indicated 14.2 g. $SnCl_2$. The yield of butyltin trichloride was 69.5% on the starting stannous chloride and 81% on the stannous chloride used. The butyltin trichloride was shown by this layer chromatography to be substantially free of other organotin halides.

Example 2

The reaction was carried out in a manner similar to Example 1 using stannous chloride (200 g.), butyl chloride (350 ml.), lauryl mercaptan (13 g.), iodine (2 g.) and magnesium (0.5 g.). Stannous chloride (98 g.) was recovered. The butyl chloride solution of the product was distilled giving a butyl chloride fraction 282.8 g. which contained 4.0 g. tin as butyltin trichloride, a fraction B.P. 55–145° C./0.3 mm. (mostly B.P. at 55–70° C.) containing butyltin trichloride (108.6 g.) containing 35.9 g. tin as butyltin trichloride. The yield on $SnCl_2$ consumed was 62.5%.

Example 3

The reaction was conducted as in Example 1 using stannous chloride (100 g.), octyl chloride (445 g.), lauryl mercaptan (13 g.), iodine (2 g.) and magnesium (0.5 g.) and stannous chloride (33.4 g.) was recovered. Distillation of the solution of the product gave a forerun of octyl chloride which contained 0.7 g. tin as octyltin trichloride and a main fraction B.P. 100–170° C./1 mm. (138 g.) (Found: Sn, 23.9; Cl, 21.9%) of octyltin trichloride. The yield on stannous chloride consumed was 80.5%.

Example 4

A mixture of stannous chloride (100 g.), lauryl mercaptan (13.0 g.), octyl chloride (445.4 g.), iodine (2 g.) magnesium powder (0.5 g.) and ethylene glycol dimethyl ether (166 g.) was stirred and heated under reflux at 150° C. for 24 hours. The product was cooled and extracted with dilute hydrochloric acid to remove unreacted stannous chloride. The solution of the product in octyl chloride was stripped to 100° C./14 mm. leaving a residue (168.6 g.) (Found: Sn, 22.3%) containing mono-octyltin trichloride. The yield was 59.8% on the stannous chloride used. Thin-layer chomatography showed that the product contained mono-octyltin trichloride; no other organo tin compounds were present Example 5

A mixture of stannous chloride (100 g.), octyl chloride (445 g.), iodine (2 g.), magnesium (0.5 g.) and di-tridecyl diselenide (10 g.) was stirred under reflux at 180° C. for 24 hours. The mixture was cooled and the solid filtered off. An iodine titration on the solids indicated 21.2 g. $SnCl_2$. The solution of product was stripped to 100° C./14 mm. giving a forecut 337 g. which contained 1.7 g. tin as octyltin trichloride and a distillate (150.3 g.) B.P. 90–120° C./0.5 mm. (mostly 90–100° C.) (Found: Sn, 29.7; Cl, 27.0%). The yield of mono-octyltin trichloride was 94% on the $SnCl_2$ consumed.

We claim:

1. The process of producing aliphatic tin halide which comprises reacting stannous halide with aliphatic halide wherein each halide has an atomic number of at least 17, in the presence of a catalyst containing a divalent chalcogen of atomic number 16–34 thereby forming aliphatic tin halide.

2. The process of producing an aliphatic tin halide claimed in claim 1 wherein said catalyst contains divalent sulphur.

3. The process of producing aliphatic tin halide claimed in claim 1 wherein said catalyst contains a mercaptan.

4. The process of producing aliphatic tin halide claimed in claim 1 wherein said catalyst contains lauryl mercaptan.

5. The process of producing aliphatic tin halide claimed in claim 1 wherein said catalyst contains a disulphide.

6. The process of producing aliphatic tin halide claimed in claim 1 wherein said catalyst contains dibutyl disulphide.

7. The process of producing aliphatic tin halide claimed in claim 1 wherein said catalyst contains a selenide.

8. The process of producing aliphatic tin halide claimed in claim 1 wherein said catalyst contains di-tridecyl diselenide.

9. The process of producing aliphatic tin halide claimed in claim 1 wherein said aliphatic halide is an alkyl halide.

10. The process of producing aliphatic tin halide claimed in claim 1 wherein said stannous halide is stannous chloride.

11. The process of producing aliphatic tin halide claimed in claim 1 which comprises reacting stannous halide with aliphatic halide wherein each halide has an atomic number of at least 17, in the presence of a catalyst containing a divalent chalcogen of atomic number 16–34 and at least one co-catalyst selected from the group consisting of metallic magnesium, zinc, cadmium, mercury, copper, cobalt, nickel, aluminum, titanium, manganese, iron, chromium, compounds of said metals, bromine, iodine, interhalogen compounds, and (when not present as a reactant) alkyl iodide.

12. The process of producing aliphatic tin halide including aliphatic tin trihalide claimed in claim 1 which comprises reacting at 50° C.–250° C. stannous halide with an aliphatic halide wherein each halide has an atomic number of at least 17 in the presence of a catalyst containing a divalent chalcogen of atomic number 16–34 thereby forming aliphatic tin halide.

13. The process of producing aliphatic tin halide including aliphatic tin trihalide claimed in claim 1 which comprises reacting stannous halide with aliphatic halide wherein each halide has an atomic number of at least 17 in the presence of a catalyst containing 0.02–0.5 mole of divalent chalcogen of atomic number 16–34 per mole of stannous halide thereby forming aliphatic tin halide.

14. The process of producing alkyltin trichloride which comprises reacting stannous chloride with alkyl chloride in the presence of a catalyst containing a divalent chalcogen of atomic number 16–34 thereby forming alkyltin trichloride.

15. The process of producing alkyltin trichloride as claimed in claim 14 wherein a co-catalyst comprising metallic magnesium is present.

16. The process of producing butyltin trichloride which comprises reacting stannous chloride with butyl chloride in the presence of a mercaptan catalyst and a co-catalyst comprising metallic magnesium thereby forming butyltin trichloride.

17. The process of producing butyltin trichloride which comprises reacting stannous chloride with butyl chloride in the presence of a mercaptan catalyst and a co-catalyst comprising metallic magnesium and iodine thereby forming butyltin trichloride.

References Cited

UNITED STATES PATENTS 3,340,283  9/1967  Gloskey _____ 260—429.7

OTHER REFERENCES

Smith et al.: J.A.C.S., (1953), vol. 75, pp. 4105–06.

TOBIAS E. LEVOW, *Primary Examiner.*

W. F. W. BELLAMY, *Assistant Examiner.*